(12) United States Patent
Hodgson et al.

(10) Patent No.: US 10,294,937 B2
(45) Date of Patent: May 21, 2019

(54) PUMP FOR CONVEYING A LIQUID, IN PARTICULAR AN EXHAUST-GAS CLEANING ADDITIVE

(71) Applicant: CONTINENTAL AUTOMOTIVE GMBH, Hannover (DE)

(72) Inventors: Jan Hodgson, Troisdorf (DE); Yves Kopp, Remering-les-Puttelange (FR); Georges Maguin, Marly (FR)

(73) Assignee: Continental Automotive GmbH, Hannover (DE)

( * ) Notice: Subject to any disclaimer, the term of this patent is extended or adjusted under 35 U.S.C. 154(b) by 1 day.

(21) Appl. No.: 15/124,065

(22) PCT Filed: Mar. 18, 2015

(86) PCT No.: PCT/EP2015/055652
§ 371 (c)(1),
(2) Date: Sep. 7, 2016

(87) PCT Pub. No.: WO2015/140201
PCT Pub. Date: Sep. 24, 2015

(65) Prior Publication Data
US 2017/0016444 A1 Jan. 19, 2017

(30) Foreign Application Priority Data

Mar. 19, 2014 (EP) .................................. 14290068

(51) Int. Cl.
| | |
|---|---|
| F04C 5/00 | (2006.01) |
| F01N 3/20 | (2006.01) |
| F04B 13/02 | (2006.01) |
| B01D 53/94 | (2006.01) |

(Continued)

(52) U.S. Cl.
CPC ............ *F04C 5/00* (2013.01); *B01D 53/9431* (2013.01); *F01N 3/206* (2013.01); *F01N 3/2066* (2013.01);

(Continued)

(58) Field of Classification Search
CPC ........ F04C 5/00; F04C 15/02; F04C 15/0003; F04C 2240/20; F04C 2240/30;

(Continued)

(56) References Cited

U.S. PATENT DOCUMENTS

| | | |
|---|---|---|
| 2,544,628 A | 3/1951 | Copping |
| 2,946,291 A | 7/1960 | Roebig |

(Continued)

FOREIGN PATENT DOCUMENTS

| | | |
|---|---|---|
| CN | 103534484 A | 1/2014 |
| DE | 2853916 A1 | 6/1980 |

(Continued)

*Primary Examiner* — Mark A Laurenzi
*Assistant Examiner* — Kelsey L Stanek
(74) *Attorney, Agent, or Firm* — Laurence A. Greenberg; Werner H. Stemer; Ralph E. Locher

(57) ABSTRACT

A pump for conveying liquid includes a pump housing having an inlet, an outlet, an inner circumferential surface and a geometric axis. An eccentric in the housing is rotatable about the geometric axis relative to the housing. A deformable element is disposed between the inner circumferential housing surface and the eccentric. A delivery duct from the inlet to the outlet is formed by the deformable element and the inner circumferential housing surface. The deformable element is pressed against the housing by the eccentric in sections so that a displaceable seal of the duct and a closed pump volume in the duct are formed and are displaceable to convey the liquid along the duct from the inlet to the outlet by rotation of the eccentric. A receptacle, accommodating an edge region of the deformable element, is formed by the inner circumferential housing surface and a counter bracket.

9 Claims, 4 Drawing Sheets

(51) Int. Cl.
*F04C 15/00* (2006.01)
*F04C 15/06* (2006.01)

(52) U.S. Cl.
CPC ......... *F04B 13/02* (2013.01); *F04C 15/0003* (2013.01); *F04C 15/06* (2013.01); *F01N 2610/02* (2013.01); *F01N 2610/1406* (2013.01); *F01N 2610/1433* (2013.01); *F01N 2610/1453* (2013.01); *F04C 2210/1083* (2013.01); *F04C 2220/24* (2013.01); *F04C 2240/20* (2013.01); *F04C 2240/30* (2013.01); *Y02A 50/2325* (2018.01); *Y02T 10/24* (2013.01)

(58) Field of Classification Search
CPC ... B01D 53/9431; F01N 3/206; F01N 3/2066; F01N 2610/02; F01N 2610/1406; F01N 2610/1433; F01N 2610/1453; F04B 13/02; Y02T 10/24

USPC .......................................................... 60/295
See application file for complete search history.

(56) References Cited

U.S. PATENT DOCUMENTS

| 3,408,947 | A | 11/1968 | McMillan |
| 5,006,049 | A | 4/1991 | Heyde et al. |
| 2014/0017094 | A1* | 1/2014 | Ghodsi-Kameneh ........... F01C 21/08 417/44.1 |

FOREIGN PATENT DOCUMENTS

| DE | 3815252 A1 | 11/1989 |
| FR | 860457 A | 1/1941 |
| WO | 2012126544 A1 | 9/2012 |

* cited by examiner

PUMP FOR CONVEYING A LIQUID, IN PARTICULAR AN EXHAUST-GAS CLEANING ADDITIVE

BACKGROUND OF THE INVENTION

Field of the Invention

The invention relates to a pump for delivering a liquid, said pump being suitable in particular for delivering an exhaust-gas purification additive (such as, for example, urea-water solution) into an exhaust-gas treatment device for the purification of the exhaust gases of an internal combustion engine.

Exhaust-gas treatment devices in which a liquid additive is used for exhaust-gas purification are widely used for example in the automotive field, wherein in particular, it is sought to remove inter alia nitrogen oxide compounds from the exhaust gas. The so-called SCR method (SCR=Selective Catalytic Reduction) is used in exhaust-gas treatment devices of said type. In the SCR method, nitrogen oxide compounds in the exhaust gas are reduced with the aid of a reducing agent (normally ammonia). Ammonia is commonly stored in the motor vehicle not directly but rather in the form of a liquid (exhaust-gas) additive which is converted into ammonia outside the exhaust gas (in an external reactor provided especially for the purpose) and/or within the exhaust gas (in the exhaust-gas treatment device). In this context, urea-water solution is preferably used as liquid additive. A urea-water solution with a urea content of 32.5% is available under the trade name AdBlue®.

In the motor vehicle, the liquid additive is commonly stored in a tank and introduced into the exhaust-gas treatment device by means of a delivery module. A delivery module comprises, in particular, a pump. The delivery module may also be assigned the following components: filter, sensor, valve and/or dosing unit.

A problem in the case of a delivery module for liquid additive is that the latter (for example the urea-water solution described further above) freezes at low temperatures. A 32.5% urea-water solution freezes at −11° C. In the automotive field, such low temperatures can arise in particular during long standstill phases in winter. When the additive freezes, an increase in volume occurs which can damage or even destroy the lines, ducts and/or components of the delivery module. The focus here is in particular also on the pump. Destruction of the pump may for example be avoided by virtue of the delivery module being evacuated upon deactivation, such that no liquid additive remains in the delivery module during a standstill phase. Another approach is for the components to be designed such (to be so flexible) that no damage can be caused by the volume expansion of the liquid additive as it freezes.

In particular within the pump, it is technically difficult to ensure measures for protection against freezing, because the pump must be in intensive contact with the liquid additive. Furthermore, a complete evacuation of the pump is often problematic because a resumption of delivery after a stoppage of operation is made considerably more difficult as a result. The pump for delivering liquid additive should also be inexpensive and exhibit high durability. This encompasses in particular high reliability and/or low failure probability and also slow aging, the latter referring in particular to a change in operating behaviour of the pump as a result of wear.

Furthermore, in the case of the pump, the capability of providing an exact delivery flow rate may also be of importance. This, or the expression "dosing accuracy", is meant here in particular to mean that the liquid flow rate actually delivered by the pump is predefined precisely by clearly determinable input variables, wherein here, the expression "input variables" describes in particular the electric actuation of the drive of the pump (voltage profile and/or current profile for driving the pump, frequency of current pulses for driving the pump, etc.). In particular, it is important that the number and/or relevance of cross-influences that influence the dependency of the delivery flow rate on the input variables is kept low. Such cross-influences could for example be the temperature of the pump, the pressure in the pump, etc. If significant cross-influences are unavoidable, the effect of said cross-influences on the delivery flow rate should be calculated and/or monitored as accurately as possible. The dosing accuracy of a pump can be described for example by means of a statistical deviation between an expected, desired delivery flow rate and an actually delivered delivery flow rate. A pump has for example a high dosing accuracy if said deviation is, on average, less than 10%. A dosing accuracy can (for urea-water delivery flow rates in the case of the SCR method) be considered to be low for example if said deviation is on average greater than 20%. These percentage values should in each case be understood merely as examples.

The documents U.S. Pat. Nos. 2,544,628, 3,408,947, DE 285 39 16 A1 and DE 381 52 52 A1 disclose a pump type also referred to as an orbital pump. Said pump type is on the one hand relatively durable with regard to a volume expansion of a liquid in the event of freezing, and furthermore said pump type can also be operated with a reversed delivery direction, such that an evacuation of a delivery module is possible in a technically simple manner. There is however a requirement for said pump type to be adapted to the demands in the field of the SCR method, in particular with regard to the dosing accuracy and/or aging behavior (for example owing to considerable stress states in the pump diaphragm).

BRIEF SUMMARY OF THE INVENTION

Taking this as a starting point, it is an object of the present invention to propose a particularly advantageous pump for the delivery of a liquid, which pump at least partially solves the above problems and is in particular suitable for the delivery of liquid additives for exhaust-gas purification (such as urea-water solution).

Said objects are achieved by means of a pump described below. Further advantageous refinements of the pump are specified in the dependent patent claims. It is pointed out that the features presented in the individual patent claims may be combined with one another in any desired technologically meaningful way and may be supplemented by explanatory facts from the description, with further design variants of the pump being specified.

The invention proposes a pump for the delivery of a liquid, which pump has at least one pump housing with at least one inlet and at least one outlet and has an inner circumferential surface and a geometric axis. Within the pump housing, there is arranged an eccentric which is rotatable relative to the pump housing about a geometric axis. Furthermore, an (annular) deformable element is arranged between the inner circumferential surface of the pump housing and the eccentric, wherein a delivery duct is formed from the at least one inlet to the at least one outlet by the deformable element and by the (cylindrical) inner circumferential surface of the pump housing. The deformable element is pressed in sections against the pump housing by the eccentric such that at least one displaceable seal of the delivery duct and at least one closed pump volume in the delivery duct are formed, these being displaceable along the delivery duct from the inlet to the outlet by means of a rotational movement of the eccentric for the delivery of the liquid. The inner circumferential surface of the pump housing and at least one counter bracket form at least one (annular) receptacle in which at least one (annular) edge region of the deformable element is received.

A pump of such construction may also be referred to as an orbital pump.

The pump has a (central) geometric axis about which the eccentric can be rotated. For this purpose, it is preferable for a drive shaft to extend along the drive axis, which drive shaft connects the eccentric to an (electrically operable) drive. The drive is preferably arranged along the axis, above and/or below the pump housing. For the description of the pump and of its components in spatial terms, a radial direction is hereinafter assumed which is perpendicular to the axis of the pump and which extends outward in a radial direction proceeding from the axis of the pump. A circumferential direction is defined perpendicular to the axis and perpendicular to the radial direction. The delivery duct extends at least in sections along said circumferential direction through the pump housing, or along the inner circumferential surface of the pump housing, from the inlet to the outlet of the pump. For the further description of the pump, a central plane of the pump is also defined. Said central plane is arranged perpendicular to the axis. The pump housing, the eccentric, the deformable element and the delivery duct lie in the central plane.

The pump housing of the pump is preferably constructed in the manner of a ring or a cylindrical chamber, inside which the eccentric is arranged. The pump housing may also be regarded as an (external) stator of the pump, wherein the eccentric is referred to as an (internal) rotor. In a further embodiment of the pump, it is possible for the pump housing to form an internal stator which is surrounded by the eccentric. The eccentric then forms an external rotor. The inlet and the outlet are arranged on the pump housing and permit the inflow and outflow of the liquid into the pump housing and into the delivery duct. This is a kinematic reversal of the above-described construction with a pump housing as an outer stator and with an inner rotor as an eccentric. The pump housing is preferably composed of plastic. Stiffening structures may be integrated in the pump housing. In a preferred design variant, in a pump housing composed of plastic, there is integrated an annular metallic insert which stiffens the pump housing.

In this case, the expression "eccentric" means in particular a circular structure which is arranged eccentrically with respect to the axis and which performs an eccentric movement when it rotates about the axis. An annular or encircling gap is formed between the pump housing and the eccentric, in which gap the deformable element is arranged. The delivery duct is arranged (within the gap) between the deformable element and the pump housing, and is delimited by the pump housing and the deformable element. The gap has at least one constriction which is displaced along the pump housing or along the delivery path by a rotation of the eccentric. At the constriction, the deformable element is pressed against the housing such that the displaceable seal is formed there. This also encompasses so-called multivalent eccentrics which form multiple constrictions between the pump housing and the eccentric. Such eccentrics may for example be designed as roller-type eccentrics which press a multiplicity of rollers against the deformable element from the inside, wherein each of said rollers forms a constriction. Between the pump housing and the deformable element, the delivery duct has a duct cross section through which liquid can flow, which duct cross section may for example (depending on the size of the pump) amount to between 1 $mm^2$ [square millimetre] and 50 $mm^2$ at the largest point.

The delivery duct is formed annularly, or in an encircling manner, around the geometric axis. The inlet and the outlet are preferably arranged with an angular spacing of greater than 270° with respect to one another (measured in the central plane) in a delivery direction of the pump. Counter to the delivery direction, the inlet and the outlet thus have an angular spacing of less than 90° with respect to one another.

The eccentric is preferably of multi-part form. The eccentric preferably has an inner region which performs an eccentric rotational movement. Furthermore, an outer bearing ring may be provided which surrounds the inner region. It is preferable for at least one bearing to be situated between the inner region and the outer bearing ring. Said bearing may be a ball bearing or a roller bearing. The inner eccentric region of the eccentric performs a rotational movement about the geometric axis during operation. The eccentric arrangement, and if appropriate also the external shape of the eccentric, result(s) in an eccentric movement of a surface of the eccentric. Said eccentric movement is transmitted to the outer bearing ring. By means of a bearing between the inner region and a bearing ring, an eccentric rotational movement of the inner region can be converted into an eccentric wobbling movement of the bearing ring without the rotational movement component of the movement of the inner region also being transmitted. The fact that the movement of the bearing ring does not have a rotational movement component makes it possible for shear stresses in the deformable element and internal friction forces of the pump to be reduced. The deformable element is flexed owing to the movement of the eccentric. It is preferable for only pressure forces and substantially no friction forces to act at a contact surface of the eccentric and of the deformable element. A corresponding division of the eccentric into an inner eccentric region and a bearing ring is also possible if the eccentric is an external rotor arranged around an (inner) pump housing. It is also possible for the outer bearing ring to be dispensed with and for the rollers of the bearing to roll directly on against the deformable element.

The deformable element is preferably arranged between the eccentric and the pump housing in such a way that the eccentric presses the deformable element in regions against the pump housing such that the at least one displaceable seal is thereby formed. At the seal, there is (linear or areal) contact between the deformable element and the pump housing, which has the effect that the liquid cannot flow through. In other words, the deformable element bears fully against the pump housing, such that the duct cross section has no cross-sectional area in the region of said displaceable seal. The delivery duct is accordingly interrupted in the region of the displaceable seal. It is thus also the case that at least one closed pump volume is formed within the delivery duct. The reference to a closed pump volume means that there is a section of the delivery duct which is closed off at least on one side. By means of a displacement of the displaceable seal, the at least one closed pump volume is also displaced, such that the liquid situated in the closed pump volume is delivered. It is preferable if, during the operation of the pump, multiple closed pump volumes are displaced from the inlet of the pump to the outlet of the pump in order to deliver the liquid. In this way, a closed pump volume is created (meaning closed off at least on one side) in the vicinity of the inlet and is then eliminated (meaning opened again at least on one side) at the outlet. At the inlet, a closed pump volume is closed off by a displaceable seal only on one side, in a downstream direction, and is connected in an upstream direction to the inlet, such that the liquid can flow through the inlet into the closed pump volume. At the outlet, the closed pump volume is (still) closed off by a seal (only) on one side, this however being in an upstream direction, and said closed pump volume is connected in a downstream direction to the outlet, such that the liquid can flow through the outlet out of the closed pump volume.

In between (on the path of the closed pump volume from the inlet to the outlet), there is a phase in which the closed pump volume is closed off upstream and downstream by the at least one displaceable seal.

The deformable element may also be referred to as a deformable diaphragm. Here, the expression "diaphragm" does not imperatively specify whether the deformable element has an areal extent. The expression "diaphragm" should be understood as an indication that the deformable element is a flexible structure that can be deformed for the delivery of liquid. As material for the deformable element or the deformable diaphragm, use is preferably made of an elastomer material (for example natural rubber or latex). To increase the durability and/or to establish and maintain the flexibility, the material of the deformable element may include additives. The deformable element is preferably flexible in all directions (in the axial direction along or parallel to the geometric axis, in the radial direction and in the circumferential direction). It is however also possible for the deformable element to exhibit at least partially directional flexibility. Said deformable element may for example exhibit greater flexibility in the radial direction than in the circumferential direction and in the axial direction. A deformation of the deformable element in one direction typically also causes a deformation in other directions. The deformable element expands for example in the axial direction and/or in the circumferential direction when compressed in the radial direction.

On the pump, there is preferably also provided a static seal which prevents an undesired backflow of the liquid from the outlet to the inlet (counter to the delivery direction). The static seal may be provided so as to be positionally fixed with respect to the pump housing and positioned between the outlet and the inlet. The deformable element may, in the region of the static seal, for example, be clamped to or adhesively bonded to the pump housing so as to permanently ensure a fluid-tight seal between the pump housing and the deformable element. The static seal is leak proof, irrespective of the position of the eccentric.

A delivery of liquid in the delivery direction from the inlet to the outlet is preferably possible by means of the pump. If appropriate, a reversal of the delivery direction (from the outlet back to the inlet rather than from the inlet to the outlet) is also possible by means of a reversal of the direction of rotation of the eccentric.

For the solution of the problems highlighted in the introduction, the at least one receptacle formed with the at least one counter bracket is of particular significance. It is preferable for two counter brackets and two receptacles to be provided which are arranged on both sides of the deformable element. Below, the counter bracket and the elements of the pump described in conjunction with the counter bracket will often be described only singly, wherein it is then normally indicated that "at least" one counter bracket or "at least" one further element (contact seal, thickened portion, receptacle, abutment surface, edge region etc.) is provided.

This wording is also intended to encompass a pump in the case of which the described elements are formed only on one side of a central plane of the pump, wherein another (different) design is realized on the other side of the central plane. It is however preferable for the pump to be of symmetrical construction with respect to the central plane, such that all of the elements (counter bracket, contact seal, thickened portion, receptacle, abutment surface, edge region etc.) provided on one side of the pump are provided again (mirror-symmetrically) on the other side of the central plane.

The described elements (counter bracket, contact seal, thickened portion, receptacle, abutment surface, edge region etc.) are furthermore preferably all of annular form. This means that the elements are (at least in sections) of rotationally symmetrical form with respect to the geometric axis of the pump. In particular in the region of the static seal, however, the stated elements generally deviate from the rotationally symmetrical form. The stated elements are for example interrupted there. Here, the stated elements are referred to as being "annular" despite deviations from the rotationally symmetrical form. Therefore, the expression "annular" is used here in particular also to mean "annular at least in sections", "predominantly annular" and/or "partially annular".

The deformable element preferably has, on both sides, two (annular) edge regions which are positioned in two correspondingly arranged receptacles (in each case to both sides of the central plane and preferably likewise annular). An edge region of the deformable element describes in particular a section, which is situated particularly far to the outside in the axial direction parallel to the geometric axis, of the deformable element, or a section, which is particularly far remote from the central plane, of the deformable element. The counter bracket is preferably in the form of an annular component which engages (only in sections) into the pump housing or engages (only in sections) around the pump housing, such that the described (annular) receptacle is formed between the counter bracket and the pump housing. It is the case here in particular that the at least one counter bracket generates radial clamping of the deformable element between the inner circumferential surface of the pump housing and the at least one counter bracket. The at least one edge region of the deformable element is clamped in the (annular) receptacle, such that an intense sealing action is generated by a contact seal between the pump housing and the deformable element and, in particular, no (lateral) escape of fluid from the delivery duct is possible at the contact seal. The contact seal runs preferably along the entire delivery duct in the pump. It is preferable for two (annular) contact seals to be provided which delimit the delivery duct axially (in the axial direction) on both sides. The at least one counter bracket preferably has an L-shaped cross-sectional area and thus engages in sections into the housing of the pump.

The at least one counter bracket need not be connected to the pump housing. The at least one counter bracket may be movable relative to the pump housing. It is important that, between the at least one counter bracket and the pump housing, there is formed at least one (annular) receptacle in which the (annular) edge region of the deformable element is received. The counter bracket may be a constituent part of a housing flange of the pump housing. The counter bracket may also be a component which is not connected to the pump housing and which is movable relative to the pump housing.

It is particularly preferable for the cylindrical inner circumferential surface of the pump housing to continue along the geometric axis beyond the delivery path to both sides. This means in particular that the cylindrical inner circumferential surface extends (in the axial direction) beyond the annular contact seals. For example, the cylindrical inner circumferential surface extends (in the axial direction) between 1 mm [millimetre] and 10 mm beyond a duct cross section of the delivery duct to both sides. This makes it possible to ensure that the (annular) contact seals cannot depart from the inner circumferential surface even under an axial displacement, but rather always remain situated entirely in or against the inner circumferential surface.

The pump is furthermore advantageous if at least one duct cross section of the delivery duct is delimited by the cylindrical inner circumferential surface, a concave duct surface of the deformable element and two contact seals between the inner circumferential surface and the deformable element.

The special delimitation of the delivery duct by the inner circumferential surface of the pump housing and by the deformable element play an important role for the solution to the problems mentioned in the introduction. In the case of the proposed pump, the delivery duct is delimited by a cylindrical inner circumferential surface of the pump housing and a concave duct surface of the deformable element. The inner cylindrical circumferential surface is in particular a surface which has a planar cylindrical form and which is neither concave nor convex in the axial direction. It is the concave duct surface of the deformable element that first makes it possible for the delivery duct to have a cross section through which flow can pass. Here, the expression "concave" does not imperatively mean that there must be a (uniform) curvature of the duct surface. Rather, the expression "concave" is also intended to express that the duct surface is set back in an axial direction between two contact seals, such that the cross section through which flow can pass is formed by the concave duct surface. It is preferable for the two (annular) contact seals between the deformable element and the inner circumferential surface to extend along the delivery duct or along the circumferential direction. In other words: In a section plane through the delivery duct spanned by the geometric axis and an arbitrary radial direction, the duct cross section is delimited by a concave arc segment of the deformable element, by a line formed by the inner circumferential surface of the pump housing, and by two punctiform contact points between the arc segment (of the deformable element) and the line (of the pump housing). Regardless of the operating conditions of the pump, the inner circumferential surface of the pump housing constitutes a clear delimitation of the delivery duct (in the radial direction). The at least one annular contact seal is consequently always situated on the circumferential surface. The annular contact seals impart a sealing action in the radial direction. This means that a radial clamping force acts on the contact seals. This leads to a particularly expedient stress distribution within the deformable element. During delivery, pressure forces acting substantially in the radial direction arise in the deformable element at the displaceable seal. As a result of the radial clamping force of the annular contact seals, all of the forces acting in the deformable element are substantially equal.

If the described section plane (spanned by the geometric axis and by the radial direction) through the deformable element and the pump housing is viewed in the region of the displaceable seal, it can be seen that, there, the deformable element bears linearly against the inner circumferential surface, such that the duct cross section is completely closed.

By means of the construction, described here, of an orbital pump, it is possible for undesired multi-axis stress states in the deformable element to be avoided in an effective manner. This considerably reduces the ageing of the deformable element. The construction, described here, of an orbital pump exhibits considerably improved durability. Furthermore, a good dosing accuracy of the pump can also be ensured over a long operating duration of the pump.

It is furthermore advantageous if at least one abutment surface is situated to the side of the deformable element in the at least one (annular) receptacle and wherein at least one (annular) edge region bears against the at least one abutment surface.

The at least one abutment surface is preferably likewise annular. The at least one abutment surface is preferably arranged in a plane orthogonal to the geometric axis of the pump. It is preferable for abutment surfaces to be provided on both sides of the deformable element (in the axial direction along the geometric axis), which abutment surfaces delimit the two (annular) receptacles in each case in an axial direction. When the pressure in the delivery duct increases, the edge region is pressed (with even greater intensity) against the abutment surface of the annular receptacle. In the process, the deformable element expands in a radial direction because more material of the deformable element is pressed into the annular receptacle. In this way, a pressing force between the pump housing and the deformable element at the contact seals is increased. The sealing action for the (lateral) sealing of the delivery duct is thus increased in the presence of increased pressure in the delivery duct.

It is particularly preferable for the two edge regions of the deformable element to be arranged in corresponding annular receptacles to the sides of the deformable element, such that, proceeding from the central plane of the pump, a symmetrical adaptation of the deformable element to the pressure in the delivery duct is realized, with the edge regions being pressed (with even greater intensity) by the increased pressure against the abutment surfaces arranged on both sides.

The pump is furthermore particularly advantageous if the at least one (annular) receptacle narrows outwardly in the radial direction proceeding from a central plane of the pump, which plane is perpendicular to the geometric axis. This means in particular that an annular gap forming the receptacle becomes (continuously) narrower in the outward direction. In this way, it can be achieved that the edge region of the deformable element is compressed the more intensely by the pump housing and by the counter bracket, the greater the intensity with which said edge region is pressed against the abutment surface. This means that the force of the radial clamping then increases correspondingly. The pressing force at the at least one contact seal consequently increases, such that the sealing action at the at least one contact seal is increased.

The pump is furthermore advantageous if the at least one contact seal is formed by at least one (encircling) thickened section in the edge region of the deformable element. A concave duct surface of the deformable element is preferably at least partly formed by the encircling thickened section in the edge region. The concave duct surface has a central region which is surrounded (on both sides) by the encircling thickened section and which, in a preferred design variant, is flat. By means of a thickened section of said type, the sealing action at the contact seal is similar to that in the case of a conventional O-ring seal. An O-ring seal is a particularly effective sealing concept, the sealing action of which is known. In particular, it is possible for the pressure-dependent sealing action of the contact seal as a function of the pressure in the delivery duct to be calculated, and for the thickened section and the receptacle to be dimensioned correspondingly. The "concave" characteristic of the duct surface may additionally be assisted by means of a concave shape of the central region of the duct surface.

It is furthermore advantageous for the duct surface of the deformable element to be interrupted by a recess which is arranged between the outlet and the inlet and into which a retention section of the pump housing engages. The recess constitutes in particular an interruption of the annular form of the duct surface of the deformable element. The recess preferably does not extend over the entire deformable element, such that, despite the recess, the deformable element forms a closed ring. The recess forms an interruption only of an (outer) region of the deformable element, in which region the duct surface of the deformable element is situated. It is preferable for the retention section to be a section of the pump housing which is fixedly connected to the pump housing, or to be an additional component which can be placed into the pump housing. The retention section serves in particular also to prevent a rotation of the deformable element relative to the pump housing, because the retention section constitutes a positively locking obstruction to such a rotation. Furthermore, the combination of the recess and the retention section may form the static seal which prevents a backflow from the outlet back to the inlet.

It is also preferable if the recess on the deformable element has in each case one undercut on both sides, and the duct surface of the deformable element extends in sections, in each case in the form of a projection, across the undercut, wherein the projections are braced against the pump housing by means of the retention section. This is a particularly advantageous possibility for forming a static seal. The retention section is in this case preferably of T-shaped form at least in sections, such that said retention section engages into the undercuts, engages around the projections, and presses against the inner circumferential surface of the pump housing. In a further preferred embodiment, the force with which the retention section braces the projections can be individually adjusted in order to achieve a suitable sealing action at the static seal. This may be achieved by means of an adjusting screw by means of which the retention section is positioned relative to the housing in order to define the sealing force acting on the projections (during the assembly of the pump).

It is furthermore advantageous if, between the duct surface of the deformable element and the inner circumferential surface of the pump housing, there is at least one contact seal which completely surrounds the duct surface and, in the region of the recess, intersects a central plane, which is perpendicular to the geometric axis, of the pump. The contact seal preferably intersects the central plane twice, specifically in each case in the edge region at the projections in the region of the recess. The duct surface forms a discontinuous (at the recess) annular surface with an encircling edge region which fully surrounds the duct surface of the deformable element. The contact seal is formed over the entire edge region of the duct surface. By means of such a configuration of the deformable element and of the delivery duct, it is possible to realize a particularly reliable and uniform seal of the delivery duct, which seal leads in particular to low-intensity bracing of the deformable element and assists in avoiding multi-axis stress states in the deformable element.

Also proposed is a motor vehicle, having an internal combustion engine, an exhaust-gas treatment device for the purification of the exhaust gases of the internal combustion engine, and a pump as described herein, wherein the pump is designed to deliver a liquid additive (in particular urea-water solution) for exhaust-gas purification (in particular in accordance with the SCR method) from a tank to an injector, by means of which the liquid additive can be supplied to the exhaust-gas treatment device.

The invention and the technical field will be explained in more detail below on the basis of the figures. In particular, it should be noted that the figures and in particular the proportions illustrated in the figures are merely schematic. The figures serve for illustrating individual features of the described pump. Design variants illustrated in the various figures may be combined with one another in any desired manner. In particular, it is not necessary for all of the features illustrated in a figure to be regarded in each case as a unit. In the figures:

BRIEF DESCRIPTION OF THE SEVERAL VIEWS OF THE DRAWING

FIG. 2,
FIG. 6: shows a section, corresponding to FIG. 5, through a pump from the prior art,
FIG. 7: shows a further illustration of the section from FIG. 5, and
FIG. 8: shows a motor vehicle having a pump for implementing the SCR method.

DESCRIPTION OF THE INVENTION

Figure 1:
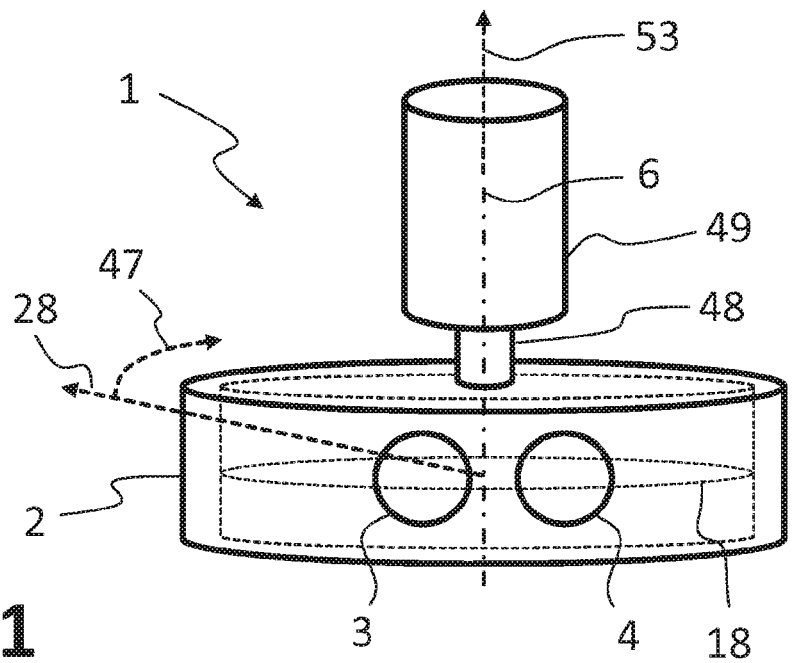
FIG. 1: shows an isometric illustration of a pump.

FIG. 1 shows a pump 1 which has a pump housing 2 with an inlet 3 and an outlet 4. In the pump housing 2 there may be positioned an eccentric (not illustrated here) which can be rotated for the delivery of liquid from the inlet 3 to the outlet 4. For the drive of the eccentric, an (electric) drive 49 is provided above the pump housing 2 along a geometric axis 53 of the pump 1, which drive is connected to the eccentric via a drive shaft 48. The geometric axis 53 corresponds to a drive axis 6 of the pump. For the further description of the pump 1, reference will be made not only to the geometric axis 53 but also to a cylindrical coordinate system with a geometric axis 53, a radial direction 28 which is perpendicular to the geometric axis 53, and a circumferential direction 47 which is perpendicular to the geometric axis and arranged tangentially to the geometric axis 53 and to the radial direction 28. Reference may also be made to a central plane 18 which centrally divides the pump housing 2 and the components (in particular the eccentric (not illustrated) and a deformable element (not illustrated)) arranged in the pump housing 2. The pump housing 2, the eccentric and the deformable element are preferably formed in each case symmetrically with respect to the central plane 18.

Figure 2:
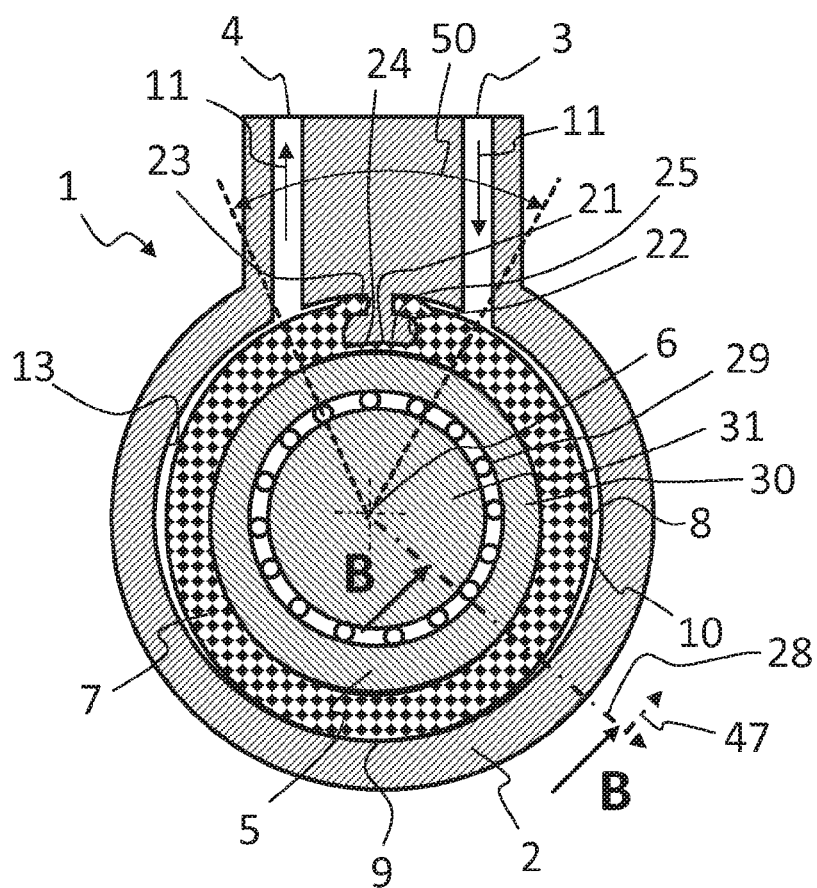
FIG. 2: shows a section through the pump from FIG. 1,
FIG. 3: shows a deformable element of a pump.

FIG. 2 illustrates a section through the pump as per FIG. 1 in the defined central plane. To illustrate this, the circumferential direction 47 and the radial direction 28 are denoted in the figure.

The figure shows the pump housing 2 with the inlet 3 and the outlet 4 which are arranged at an angle 50 to the pump housing 2. In the pump housing 2 there is situated an eccentric 5 which can perform an eccentric wobbling movement about a geometric axis 53. The eccentric 5 is divided into an inner eccentric region 29, an outer bearing ring 30 and a bearing 31. When the inner eccentric region 29 performs an eccentric rotational movement about the geometric axis 53, the bearing 31 transmits this to the bearing ring 30, such that the bearing ring 30 performs an eccentric wobbling movement. There are a deformable element 7 and a delivery duct 8 between the pump housing 2 and the eccentric. The delivery duct 8 is formed between the pump housing 2 and the deformable element 7. The eccentric 5 presses the deformable element 7 in sections against the pump housing 2 such that a displaceable seal 9 is formed which interrupts the delivery duct 8 and divides the delivery duct 8 into closed pump volumes 10. By means of a rotation of the eccentric 5, the displaceable seal 9 can be displaced along a delivery direction 11 from the inlet 3 to the outlet 4.

The deformable element 7 as per FIG. 2 has, between the inlet 3 and the outlet 4, a static seal 25, which prevents a backflow of liquid from the outlet 4 to the inlet 3. The static seal 25 is formed by a recess 21 which has undercuts 22, the latter being spanned in each case by projections 23 of the deformable element. The recess 21 is in this case of T-shaped form. A retention section 24 of the pump housing 2 engages into the recess 21. Said retention section 24 may be an integral constituent part of the pump housing 2 or may be a component which is separate from the pump housing 2 and which is additionally inserted into the pump housing 2. By means of the recess 21 and the retention section 24, the deformable element 7 is fixed in the pump housing 2 so as to be prevented from rotating.

Figure 3:
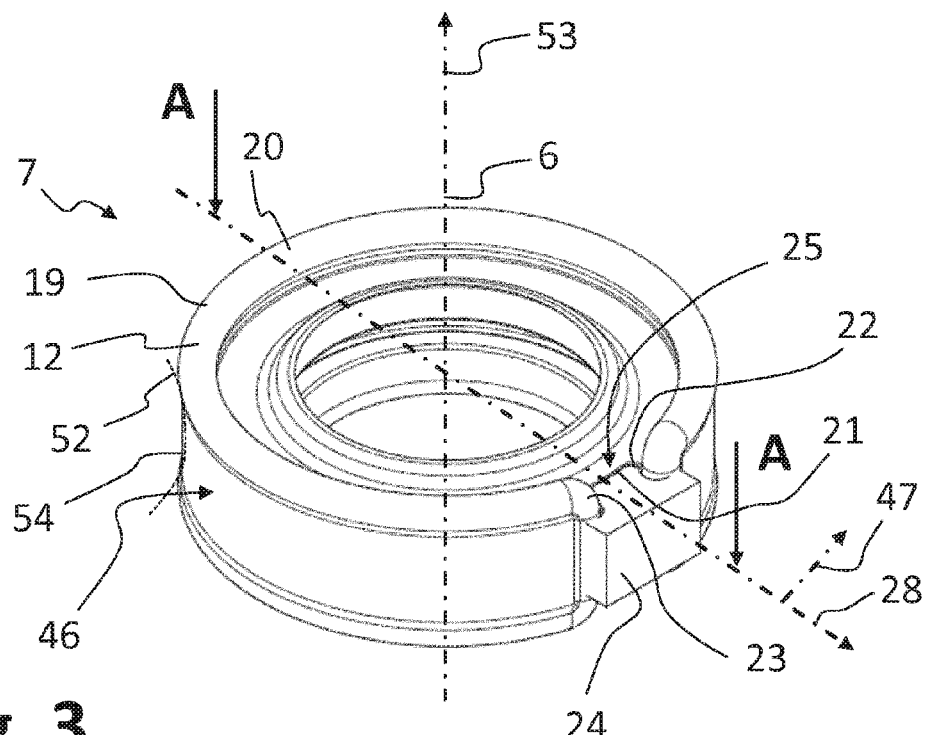

FIG. 3 shows an isometric illustration of the deformable element 7 of the pump. For spatial orientation, the coordinate system composed of geometric axis, circumferential direction 47 and radial direction 28 is illustrated in the figure. The deformable element 7 has an (outer) concave duct surface 46 which, together with the inner circumferential surface (not illustrated here) of the pump housing, delimits the delivery duct (likewise not illustrated). In this case, the expression "concave" means in particular that the concave duct surface 46 is concave in the direction of the geometric axis 53. The concave form of the duct surface 46 is illustrated in FIG. 3 by a dashed marking line 52. The concave duct surface 46 of the deformable element 7 has, in an encircling edge region 20, a thickened section 19 which has a contact seal 12 at which the deformable element 7 bears against the inner circumferential surface (not illustrated here) of the pump housing (likewise not illustrated). The "concave" characteristic of the concave duct surface 46 is preferably generated by the thickened portion 19 on both sides. The thickened portion 19 on both sides surrounds a central region 54 on the deformable element 7, wherein the central region 54 is preferably flat. The concave duct surface 46 can thus be formed by the central region 54 and by the thickened portion 19 on both sides. Furthermore, the central region 54 itself may also have a concave form. It is also possible to see the recess 21 on the concave duct surface 46 of the deformable element 7. The recess 21 is delimited on both sides by an undercut 22 and by projections 23 which extend over the undercuts 22. A retention section 24 of the pump housing (not illustrated here) engages into the recess 21. The static seal 25 described above is formed by the recess 21.

Figure 4:
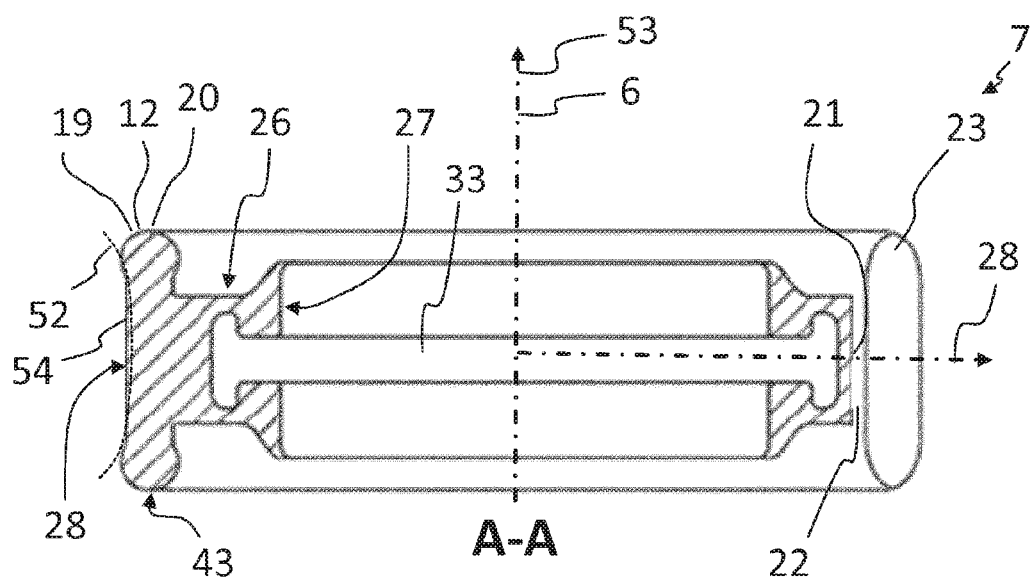
FIG. 4: shows a section through the deformable element from FIG. 3,
FIG. 5: shows a detail section through the pump as per

FIG. 4 shows, in a sectional view, the deformable element 7 illustrated in FIG. 3. For orientation, the geometric axis 53 and the radial direction 28 are illustrated in FIG. 4. It is also possible to see the concave duct surface 46 of the deformable element 7, said concave duct surface being indicated by the marking line 52. The concave form of the concave duct surface 46 is formed by the thickened portion 19 in the edge region 20 and by the central region 54 of the duct surface 46. The thickened portion 19 in the edge region also forms the contact seals 12. On the right-hand side, the deformable element 7 is shown in the region of the recess 21, such that the undercut 22 and a projection 23 are visible. It can also be seen in FIG. 4 that the deformable element 7 has a contact region 43 and a support region 27 which are connected to one another via a waist 26, wherein the contact region 43 has formed the duct surface 46 for abutment against the pump housing 2 and is designed to form the delivery duct 8 together with the pump housing 2. On the support region 27, there is provided a clamping groove 33 by means of which the deformable element 7 can be clamped onto a clamping strip (of the eccentric which is not illustrated here).

Figure 5:
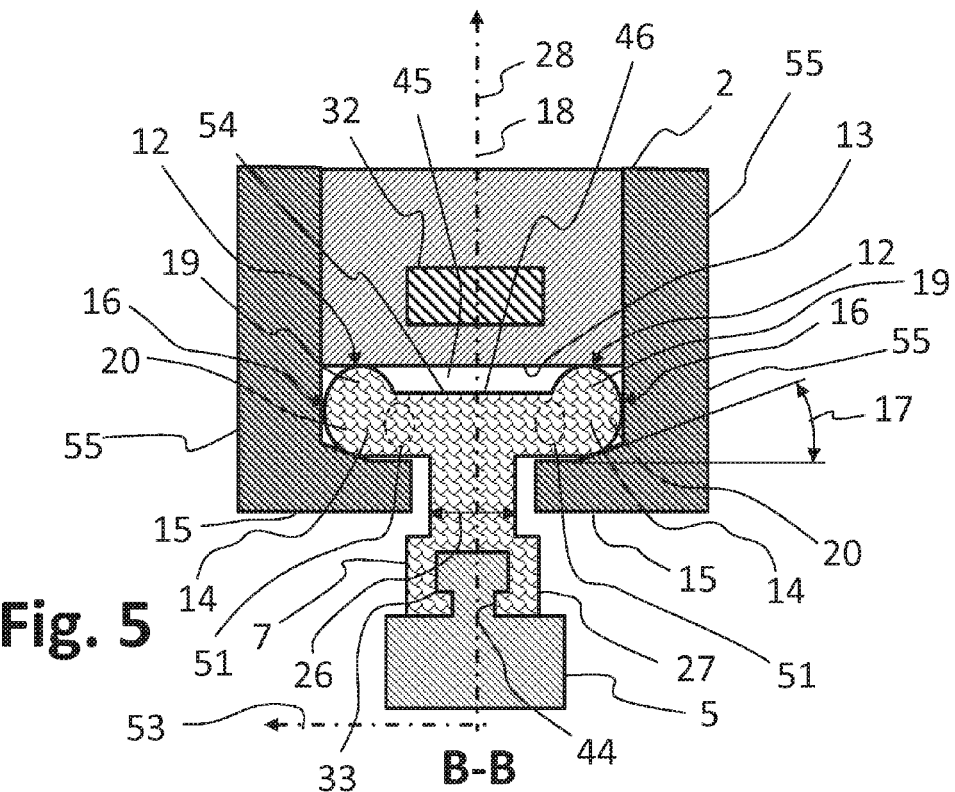

FIG. 5 shows the detail section B-B, marked in FIG. 2, through the pump. For orientation, the central plane 18 and the radial direction 28 and the geometric axis 53 are indicated here. The figure shows the pump housing 2, the eccentric 5 and the deformable element 7 between the eccentric 5 and the pump housing 2. The figure also shows the inner circumferential surface 13 of the pump housing 2 and the concave duct surface 46 of the deformable element 7, and also the two linear contact seals 12 between the deformable element 7 and the pump housing 2, which together delimit the duct cross section 45.

The deformable element 7 has a contact region 43, which forms the concave duct surface 46, and a support region 27, against which the eccentric 5 bears. Between the contact region 43 and the support region 27 there is preferably a waist 26 which is narrowed in relation to the contact region 43 and/or in relation to the support region 27. In the support region 27, the deformable element 7 has a clamping groove 33 into which a clamping strip 44 of the eccentric 5 engages. The concave duct surface 46 is formed by a (flat) central region 54 and by edge regions 20 which adjoin said central region on both sides, wherein thickened portions 19 are formed in each of the edge regions 20. There may be connecting regions 51 in each case between the edge regions 20 and the central region 54, in which the deformable element 7 exhibits particularly good deformability. The expansion of the connecting regions 51 is illustrated here by way of example using dashed lines. This improves the mobility of the edge regions 20, of the contact seals 12 and of the thickened portions 19 relative to the central region of the deformable element 7.

FIG. 5 also illustrates two counter brackets 15 which are formed from housing flanges 55 and which, as annular components, are inserted into the pump housing 2 on both sides and thus each form an annular receptacle 14 in which the edge regions 20 of the deformable element 7 are situated. The counter bracket 15 and the pump housing 2 engage around the deformable element 7 (only) in sections. In the receptacle 14, to the sides of the deformable element 7, there is situated in each case one abutment surface 16 against which the deformable element 7 bears. When the pressure in the delivery duct 8 rises, the edge regions 20 are pressed with greater intensity against the stop surfaces 16. The receptacles 14 preferably have, toward the outside (in each case away from the central plane 18 in the direction of the geometrical axis 53), a chamfer 17 by means of which the receptacles 14 narrow in the outward direction toward the abutment surfaces 16. It can be achieved in this way that a pressing force on the contact seal 12 increases, the more firmly the edge region 20 is pushed outward against the abutment surface 16 by the pressure in the delivery duct 8.

The illustration of FIG. 5 also shows that, in the pump housing 2, there is integrated an insert 32 which stiffens the pump housing 2. The pump housing 2 is preferably composed of plastic, and the insert 32 is preferably a metallic ring which stiffens the pump housing 2 such that the latter is not deformed by a movement of the eccentric 5.

Figures 6, 7:
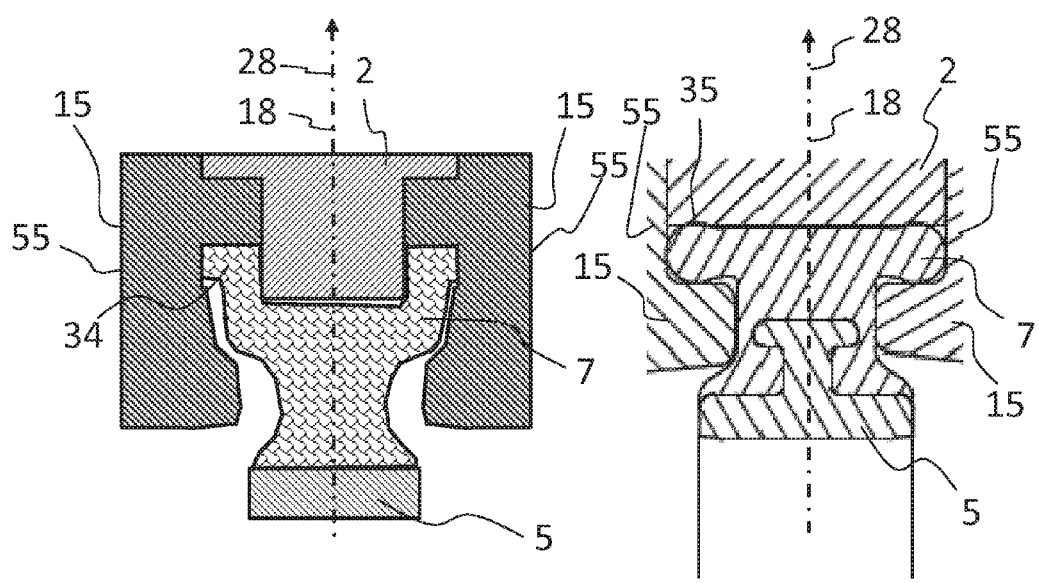

FIGS. 6 and 7 illustrate, again schematically, the cross section B-B from FIG. 5, wherein FIG. 6 describes a corresponding cross section in the case of a pump according to the prior art (for example as per the documents U.S. Pat. Nos. 2,544,628, 3,408,947 DE 285 39 16 A1 and DE 381 52 52 A1) and FIG. 7 illustrates a corresponding cross section through a pump of the type described here. For orientation, the central plane 18, the radial direction 28 and the geometric axis 53 are illustrated here (as in FIG. 5). The figure also shows the pump housing 2, the eccentric 5 and the deformable element 7 and also the counter brackets 15 which are formed by housing flanges 55 and by means of which the deformable element 7 is braced against the pump housing 2. In the design variant according to the prior art in FIG. 6, the deformable element 7 extends in sections around the pump housing 2 and is braced, by way of an axial clamping section 34, between the counter brackets 15 and the pump housing 2. As per FIG. 7, there is a radial clamping section 35 of the deformable element 7 between the pump housing 2, the counter bracket 15 and the receptacles 4, as has also already been described in conjunction with FIG. 5 by the corresponding arrangement of the annular edge regions 20 of the deformable element 7.

Figure 8:
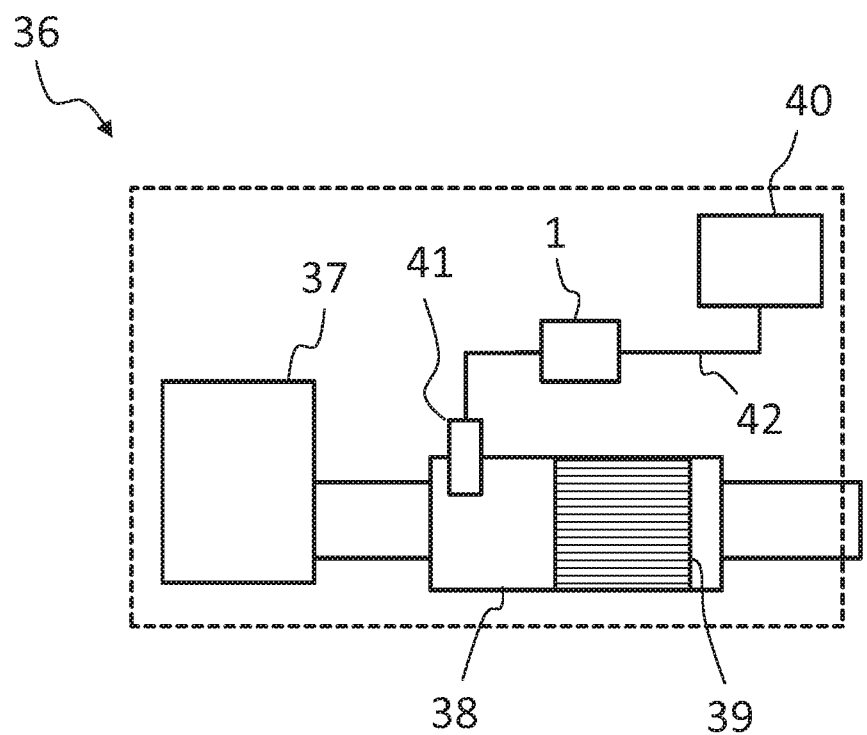

FIG. 8 shows a motor vehicle 36 having an internal combustion engine 37 and having an exhaust-gas treatment device 38 for the purification of the exhaust gases of the internal combustion engine 37. In the exhaust-gas treatment device 38 there is arranged an SCR catalytic converter 39 by means of which the method of selective catalytic reduction can be carried out in order to purify the exhaust gases of the internal combustion engine 37. For this purpose, a liquid additive for exhaust-gas purification may be supplied to the exhaust-gas treatment device 38 by means of an injector 41. Liquid additive is supplied from a tank 40 to the injector 41 via a line 42. On the line 42 there is arranged a pump 1 as described above, which pump performs the delivery and if appropriate also the dosing of the liquid additive.

LIST OF REFERENCE NUMERALS

1 Pump
2 Pump housing
3 Inlet
4 Outlet
5 Eccentric
6 Drive axis
7 Deformable element
8 Delivery duct
9 Displaceable seal
10 Pump volume
11 Delivery direction
12 Contact seal
13 Inner circumferential surface
14 Receptacle
15 Counter bracket
16 Abutment surface
17 Chamfer
18 Central plane
19 Thickened section
20 Edge region
21 Recess
22 Undercut
23 Projection
24 Retention section
25 Static seal
26 Waist
27 Support region
28 Radial direction
29 Eccentric region
30 Bearing ring
31 Bearing
32 Inlay
33 Clamping groove
34 Axial clamping section
35 Radial clamping section
36 Motor vehicle
37 Internal combustion engine
38 Exhaust-gas treatment device
39 SCR catalytic converter
40 Tank
41 Injector
42 Line
43 Contact region
44 Clamping strip
45 Duct cross section
46 Concave duct surface
47 Circumferential direction
48 Drive shaft
49 Drive
50 Angle
51 Connection region
52 Marking line
53 Geometric axis
54 Central region
55 Housing flange

The invention claimed is:

1. A pump for delivering a liquid, the pump comprising:
at least one pump housing having at least one inlet, at least one outlet, an inner circumferential surface and a geometric axis;
an eccentric disposed within said at least one pump housing and rotatable relative to said at least one pump housing about said geometric axis;
a deformable element disposed between said inner circumferential surface of said at least one pump housing and said eccentric, said deformable element having at least one edge region defined by a thickened section having a contact seal bearing against said inner circumferential surface;
a delivery duct formed from said at least one inlet to said at least one outlet by said deformable element and said inner circumferential surface of said at least one pump housing;
said eccentric pressing said deformable element in sections against said at least one pump housing to form at least one displaceable seal of said delivery duct and at least one closed pump volume in said delivery duct;
said at least one displaceable seal and said at least one closed pump volume being displaceable along said delivery duct from said at least one inlet to said at least one outlet by a rotational movement of said eccentric for delivering the liquid; and at least one counter bracket along with said inner circumferential surface of said at least one pump housing forming at least one receptacle receiving said at least one edge region of said deformable element.

2. The pump according to claim 1, wherein said inner circumferential surface continues along said geometric axis beyond said delivery duct toward both sides of said pump housing.

3. The pump according to claim 1,
wherein said contact seal is two contact seals disposed between said inner circumferential surface and said deformable element;
said deformable element has a concave duct surface; and
said delivery duct has at least one duct cross section delimited by said inner circumferential surface, by said concave duct surface and by said two contact seals.

4. The pump according to claim 3,
wherein a central plane of the pump is perpendicular to said geometric axis;
said at least one receptacle narrowing outwardly in radial direction from said central plane of the pump.

5. The pump according to claim 1, wherein said deformable element has sides, at least one abutment surface is disposed in said at least one receptacle towards said sides of said deformable element, and said at least one edge region bears against said at least one abutment surface.

6. A motor vehicle, comprising:
an internal combustion engine;
an exhaust-gas treatment device for purification of exhaust gases of said internal combustion engine
a tank configured to hold a liquid additive for exhaust-gas purification;
an injector for supplying the liquid additive to said exhaust-gas treatment device; and
a pump according to claim 1 configured to deliver the liquid additive from said tank to said injector.

7. A pump for delivering a liquid, the pump comprising:
at least one pump housing having at least one inlet, at least one outlet, an inner circumferential surface and a geometric axis;
an eccentric disposed within said at least one pump housing and rotatable relative to said at least one pump housing about said geometric axis;
a deformable element disposed between said inner circumferential surface of said at least one pump housing and said eccentric, said deformable element having at least one edge region, said deformable element having a concave duct surface;

a delivery duct formed from said at least one inlet to said at least one outlet by said deformable element and said inner circumferential surface of said at least one pump housing;
two contact seals disposed between said inner circumferential surface and said deformable element;
said delivery duct having at least one duct cross section delimited by said inner circumferential surface, by said concave duct surface and by said two contact seals;
said at least one pump housing having a retention section, said concave duct surface of said deformable element being interrupted by a recess disposed between said at least one outlet and said at least one inlet, and said retention section of said at least one pump housing engaging into said recess;
said eccentric pressing said deformable element in sections against said at least one pump housing to form at least one displaceable seal of said delivery duct and at least one closed pump volume in said delivery duct;
said at least one displaceable seal and said at least one closed pump volume being displaceable along said delivery duct from said at least one inlet to said at least one outlet by a rotational movement of said eccentric for delivering the liquid; and
at least one counter bracket along with said inner circumferential surface of said at least one pump housing forming at least one receptacle receiving said at least one edge region of said deformable element.

8. The pump according to claim 7, wherein:
said recess in said deformable element has sides and a respective undercut on each of said sides;
said concave duct surface of said deformable element extends in sections each being formed as a projection across said undercut; and
said projections are braced against said at least one pump housing by said retention section.

9. The pump according to claim 7, which further comprises:
a drive axis of the pump; and
a central plane perpendicular to said drive axis of the pump;
at least one of said two contact seals being disposed between said concave duct surface of said deformable element and said inner circumferential surface of said at least one pump housing, said at least one contact seal completely surrounding said concave duct surface and intersecting said central plane in a vicinity of said recess.

* * * * *